United States Patent [19]

Heinen et al.

[11] 4,072,587

[45] Feb. 7, 1978

[54] SEPARATE RECOVERY OF SILVER AND GOLD FROM CYANIDE SOLUTIONS

[75] Inventors: Harold J. Heinen; David G. Peterson; Roald E. Lindstrom, all of Reno, Nev.

[73] Assignee: The United States of America as represented by the Secretary of the Interior, Washington, D.C.

[21] Appl. No.: 789,599

[22] Filed: Apr. 21, 1977

Related U.S. Application Data

[63] Continuation-in-part of Ser. No. 718,228, Aug. 27, 1976, abandoned.

[51] Int. Cl.$^2$ .............................................. C01B 1/00
[52] U.S. Cl. ..................................... 204/110; 423/37

[58] Field of Search .................... 423/27, 29, 37, 42, 423/561 R; 204/110; 75/105, 118, 106

[56] References Cited

U.S. PATENT DOCUMENTS

| | | | |
|---|---|---|---|
| 515,148 | 2/1894 | Janin et al. | 423/37 |
| 671,704 | 4/1901 | Kendall | 423/37 |
| 3,920,403 | 11/1975 | Ross | 204/110 |

*Primary Examiner*—Earl C. Thomas
*Assistant Examiner*—Brian E. Hearn
*Attorney, Agent, or Firm*—William S. Brown; Donald A. Gardiner

[57] ABSTRACT

Silver and gold are selectively recovered from cyanide solutions by addition of lime, and precipitation of the silver as sulfide by means of sodium sulfide, followed by electrowinning of gold from the filtrate.

2 Claims, No Drawings

SEPARATE RECOVERY OF SILVER AND GOLD FROM CYANIDE SOLUTIONS

This application is a continuation-in-part of application Ser. No. 718,228, filed Aug. 27, 1976, now abandoned.

This invention relates to recovery of silver and gold from cyanide solutions containing both metals, particularly to solutions obtained by processing low-grade silver-gold ores. Such processing conventionally consists of treatment of the crushed ore with a dilute solution of sodium or calcium cyanide in the presence of oxygen, whereby the silver and gold are dissolved as cyanide complexes. Enrichment of the resulting solution, with respect to silver and gold, is then achieved by adsorption of the metal-cyanide complexes on activated carbon, and stripping of the loaded carbon with caustic cyanide solution which may also contain alcohol. Such processes are disclosed in Bureau of Mines Reports of Investigations 4672 and 4843, in U.S. Pat. No. 3,935,006 and in U.S. patent application Ser. No. 660,942, filed Feb. 24, 1976. The resulting enriched strip solution will typically contain about $0.18 \times 10^{-6}$ to $18 \times 10^{-6}$ moles per liter of silver, about $0.5 \times 10^{-6}$ to $15 \times 10^{-6}$ moles per liter of gold, about $5 \times 10^{-6}$ to $40 \times 10^{-6}$ moler per liter of cyanide ion, and will have a pH of about 12 to 14. In addition, about 5 to 20 percent of alcohol may be present if employed in the strip solution. Composition of the enriched strip solutions may vary considerably, depending on the specific stripping solutions and conditions employed, but the solutions are all suitable for use in the process of the invention.

Conventionally, the enriched strip solution is electrolyzed to recover the silver and gold values by deposition on a steel wool cathode. Periodically the cathode is removed and sent to a refinery to be cast into dore bars typically containing about 10 to 20 percent silver. These bars are then refined by chlorination of the molten dore, silver being separated from the gold as AgCl which is manually skimmed into a separate container. However, a certain proportion of the gold reacts with the chlorine to form volatile chlorides, thereby requiring an elaborate and costly collection system for gold recovery.

It has now been found, according to the process of the invention, that separate recoveries of silver and gold from the enriched caustic-cyanide strip solutions may be readily and economically achieved by initial precipitation of the silver with sodium sulfide in the presence of lime, i.e., CaO, according to the following reaction:

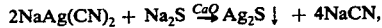
$$2NaAg(CN)_2 + Na_2S \xrightarrow{CaO} Ag_2S\downarrow + 4NaCN,$$

the gold remaining in solution as the aurocyanide complex. The precipitated silver sulfide is recovered by conventional means such as filtration, and the filtrate is electrolyzed to recover the gold.

The presence of CaO in an amount of about 0.1 to 2.2 pound CaO per ton of strip solution has been found to be essential to the formation of readily filterable $Ag_2S$ flocs. Without addition of CaO, the $Na_2S$ treatment produces a colloidal suspension of $Ag_2S$ which is very difficult to filter. The CaO is dissolved in the enriched strip solution prior to addition of the $Na_2S$.

It has also been found that a small excess of $Na_2S$, i.e., about 110 to 150 percent of the stoichiometric amount, is required to achieve substantially complete, i.e., about 99 percent or greater, precipitation of the total silver from solutions containing up to 2 pounds NaCN per ton. The presence of this small excess of sulfide ion in the filtrate has been found to have no deleterious effect on subsequent recovery of gold by electrowinning, or on recycling of barren electrolyte for desorbing additional silver and gold from loaded activated carbon. A high concentration of sulfide ions in solution is, however, to be avoided since it will tend to fix any residual silver on the carbon, making it impossible to desorb the silver with caustic-cyanide strip solution.

Precipitation of the silver, by the above reaction, proceeds readily at ambient temperature and pressure. However, prolonged agitation of the $Ag_2S$ precipitate should be avoided since the reaction is reversible and the $Ag_2S$ tends to redissolve slowly.

Recovery of gold from the filtrate is achieved by means of a conventional process in which the gold is deposited on a steel wool cathode, the resulting gold cathode sponge being fire refined to produce gold bullion suitable for commercial applications or electrorefining. Recovery of the silver from the $Ag_2S$ precipitate is also by conventional means such as fire refining with a borax-soda ash flux and metallic iron.

Although the process of the invention is particularly effective for treatment of the above-discussed enriched strip solutions, it may also be employed for processing of other silver and gold-containing cyanide solutions, such as those generated in cyanidation of electronic scrap metals and waste cyanide plating solutions.

The invention will be more specifically illustrated by the following example.

EXAMPLE

A semicontinuous test was conducted on a 2-pound charge of loaded activated carbon, contaning 94 oz Au/ton and 45 oz Ag/ton, to evaluate the desorption process involving stripping, selective recovery of silver as $Ag_2S$, electrowinning of gold from $Ag_2S$ filtrate, and recycling of barren electrolyte. Loaded carbon was obtained from a cyanide plant utilizing the carbon-in-pulp cyanidation process. The 1.5 pound carbon charge was stripped with 1 percent NaOH-0.1 percent NaCN-20 vol-pct methanol at a pH of about 14 and a temperature of 80° C. Most of the silver was desorbed during treatment with 10 bed volumes of strip solution (15 liters), whereas the gold required a total of 20 bed volumes of strip solution. Each 5-liter volume of enriched strip solution was agitated with 0.5 pound of 98% grade CaO and 0.06 pound of technical grade $Na_2S$ per troy ounce of silver (145 percent of theoretical $Na_2S$) for 1 hour and filtered. Selective recovery of silver as $Ag_2S$ precipitate is shown in table 1.

Table 1

| Solution increment | Typical results for the $Ag_2S$ precipitation step | | | |
|---|---|---|---|---|
| | Strip solution assay, ppm | | $Ag_2S$ filtrate assay, ppm | |
| | Ag | Au | Ag | Au |
| 1 | 80 | 370 | 0.6 | 370 |
| 2 | 39 | 190 | 0.6 | 190 |
| 3 | 21 | 110 | 2.5 | 110 |
| 4 | 34 | 70 | 2.3 | 70 |

The silver sulfide precipitates were combined and fire assayed for silver and gold. The precipitate assayed 5,588 ounces Ag/ton and less than 0.005 ounce gold per ton.

The $Ag_2S$ filtrates were electrolyzed to win the gold on a steel wool cathode and the barren electrolyte was recycled to strip more gold. The gold cathode sponge was fire refined using a flux containing borax, soda ash, silica, nitre, manganese dioxide and fluorspar. A gold bead, 992 fine, was produced.

We claim:

1. A process for selective recovery of silver and gold from cyanide solutions containing both metals comprising (1) adding to the solution about 0.1 to 2.2 pound CaO per ton of solution, (2) treating the resulting solution with sodium sulfide in an amount of about 110 to 150 percent of the stoichiometric amount to precipitate the silver as silver sulfide, (3) filtering to remove the precipitated silver sulfide, and (4) electrolyzing the filtrate to deposit the gold at the cathode.

2. The process of claim 1 in which the silver and gold-containing cyanide solution is obtained by stripping activated carbon loaded with cyanide complexes of the metals.